United States Patent [19]

Kreuzer et al.

[11] 4,032,499

[45] June 28, 1977

[54] METHOD FOR PREPARING MODIFIED POLYSILOXANES

[75] Inventors: Franz-Heinrich Kreuzer; Manfred Wick, both of Munich, Germany

[73] Assignee: Consortium fur Elektrochemische Industrie GmbH, Munich, Germany

[22] Filed: Jan. 31, 1975

[21] Appl. No.: 545,958

[30] Foreign Application Priority Data

Feb. 7, 1974 Germany .......................... 2405828

[52] U.S. Cl. .................. 260/33.4 SB; 260/29.2 M; 260/33.8 SB; 260/34.2; 260/827
[51] Int. Cl.² .......................................... C08K 5/05
[58] Field of Search ...... 260/827, 33.8 SB, 29.2 M, 260/33.4 SB

[56] References Cited

UNITED STATES PATENTS 3,694,478  9/1972  Adams et al. ................. 260/827 X

*Primary Examiner*—Lewis T. Jacobs

[57] ABSTRACT

An improved method for preparing modified organopolysiloxanes which comprises graft polymerizing monomers containing aliphatic unsaturation onto organopolysiloxanes in the presence of a free radical and an inert liquid having a boiling point up to about 100° C. at 760 mm Hg (abs.) and which is a nonsolvent for the organopolysiloxanes and the graft polymers at the applicable polymerization temperatures.

7 Claims, No Drawings

METHOD FOR PREPARING MODIFIED POLYSILOXANES

This invention relates to modified organopolysiloxanes and more particularly to a method for preparing modified organopolysiloxanes by graft polymerizing monomers containing aliphatic unsaturation onto organopolysiloxanes in the presence of free radicals and in inert liquid having a boiling point up to about 100° C at 760 mm Hg (abs.) and which is a nonsolvent for the organopolysiloxane and the grafted polymers.

Modified organopolysiloxanes have been prepared heretofore by the graft polymerization of monomers containing aliphatic unsaturation onto organopolysiloxanes in the presence of free radicals as shown in U.S. Pat. Nos. 3,555,109 and 3,776,875 to Getson. Also, U.S. Pat. No. 3,631,087 to Lewis et al. describes a graft polymerization process in which monomers and free radical initiators are gradually added to organopolysiloxanes heated to the desired temperature to form modified organopolysiloxanes.

The method of this invention has certain advantages over the methods described heretofore for preparing modified organopolysiloxanes. For example, the method of this invention provides a means for forming rod-like solid polymers which are present in liquid polymers. Moreover, the method of this invention provides a means for controlling the exothermic reaction resulting from the graft polymerization. Likewise, the method of this invention provides a means for forming grafted organopolysiloxanes from monomers which heretofore could not be used in the graft polymerization because of the exothermic reaction.

It is therefore an object of this invention to provide a method for grafting organopolysiloxanes. Another object of this invention is to provide a method for grafting monomers containing aliphatic unsaturation onto organopolysiloxanes. Another object of this invention is to provide a means for controlling the exothermic reaction resulting from the graft polymerization. A further object of this invention is to provide a method for preparing modified organopolysiloxanes from monomers which were too reactive to be employed in the conventional graft polymerization processes.

The foregoing objects and others which will become apparent from the following description are accomplished in accordance with this invention, generally speaking, by grafting a monomer having aliphatic unsaturation onto an organopolysiloxane in the presence of a free radical initiator and a liquid which is nonreactive with the polymerization components and has a boiling point up to about 100° C. at 760 mm Hg (abs.) and furthermore is a nonsolvent for the organopolysiloxane and the resulting graft polymers obtained from the graft polymerization.

Any polymerizable monomer having aliphatic unsaturation which has been employed in the processes known heretofore may be used in the process of this invention to prepare modified organopolysiloxanes.

Examples of suitable monomers having aliphatic unsaturation are aliphatic hydrocarbons such as ethylene, propylene and butylene; vinyl halides such as vinyl fluoride and vinyl chloride; vinyl esters of organic acids such as vinyl acetate; styrene and substituted styrenes, as well as other aromatic and hetero-cyclic vinyl compounds such as vinylnaphthalene and vinylpyridine; acrylic acid and derivatives of acrylic acid including the salts, esters and amides of acrylic acid as well as acrylonitrile; N-vinyl compounds such as N-vinylcarbazole, N-vinylpyrrolidone and N-vinylcaprolactam; silanes which contain vinyl groups such as vinyltriethoxysilane; symmetrically disubstituted ethylenes such as vinylene carbonate and asymmetrically disubstituted ethylenes such as vinylidene fluoride, vinylidene chloride, vinylidene cyanide, methacrylic acid and derivates of methacrylic acid such as the salts, esters and amides as well as methacrylonitrile and methacrolein.

The monomers may be used singly or in combinations of two or three or even more. It is possible, for example, to use methacrylic acid alone or to use mixtures of, for example, styrene and n-butyl acrylate or mixtures consisting of an acrylic ester and acrylonitrile or esters and nitriles of substituted acrylic acids, for example, to use mixtures of ethyl acrylate and methacrylonitrile. Also, it is possible to use mixtures consisting of one or several of the above mentioned monomers as well as monomers which are particularly easily polymerizable with other monomers such as maleic anhydride, esters of maleic acid and fumaric acid, stilbene, indene and coumarone.

Organopolysiloxanes capable of forming free radicals or active sites may be used in the graft polymerization to form modified organopolysiloxanes. Thus, the organopolysiloxanes should be capable of forming free radicals by hydrogen abstraction and should be substantially free of any tendency to undergo further polymerization under the conditions employed. Accordingly, the organopolysiloxanes should be substantially free of any aliphatic unsaturation and preferably contain no more than two hydrolyzable groups per molecule.

The organopolysiloxanes used in the process of this invention may be represented by the general formula

HO Si R$_2$ O (SiR$_2$O)$_n$ Si R$_2$ OH wherein the R radicals which may be the same or different represent monovalent hydrocarbon radicals or substituted monovalent hydrocarbon radicals and $n$ is a number having a value of at least 1. Examples of suitable monovalent hydrocarbon radicals are alkyl radicals having from 1 to 10 carbon atoms such as, for example, methyl, ethyl, propyl, butyl, hexyl, octyl and decyl radicals, cycloalkyl radicals such as the cyclohexyl radical; aryl radicals such as the phenyl radical, alkaryl radicals such as the tolyl radical and aralkyl radicals such as the benzyl radical. The substituted monovalent hydrocarbon radicals represented by R are halogenated hydrocarbon radicals or cyanoalkyl radicals such as the 3,3,3-trifluoropropyl radical, chlorophenyl radicals or the betacyanoethyl radical. It is preferred that at least 50 percent of the R radicals be alkyl radicals having from 1 to 4 carbon atoms and more preferably methyl radicals.

The value of $n$ is not critical and may range from 1 to about 30,000 and more preferably from about 2,000 to about 20,000. Although this is not always indicated in formulas of this type, there can be within or along the siloxane chain in the above formula siloxane units other than diorganosiloxane units in amounts up to about 10 mol percent. Generally they are present only as impurities. The lower limit of the ratio of R radicals to Si atoms is preferably 1.9, whereas the upper limit in the ratio of R radicals to Si atoms is preferably 2.25.

The organopolysiloxanes employed in the process of this invention can be either homo- or co-polymers.

Examples of organopolysiloxanes which are preferable employed are hydroxyl-terminated dimethylpolysiloxanes and hydroxyl-terminated copolymers containing dimethylsiloxane and methylphenylsiloxane and/or phenylsiloxane units.

Organopolysiloxanes, other than those corresponding to the above formula, may be employed in the process of this invention. For example, organopolysiloxanes in which at least one of the two hydroxyl groups has been replaced by a triorganosiloxy group, particularly a trimethylsiloxy group may be used. Other organopolysiloxanes which do not correspond to the previously cited formula such as cyclic organopolysiloxanes, e.g., octamethylcyclotetrasiloxane, may also be employed in the process of this invention.

The organopolysiloxanes used in the graft polymerization are preferably liquids which can easily be agitated at the polymerization temperature. It is preferred that their viscosity be at least 50 cP at 25° C. and no higher than about 10,000 cP at 25° C., while no higher than 1,000 cP at 25° C. is particularly preferred. When mixing devices are available which are capable of exerting high shearing stresses, it is possible to use highly viscous diorganopolysiloxanes having viscosities of more than $10^6$ cP at 25° C.

The ratio of organopolysiloxane to monomer having aliphatic unsaturation may vary within wide parameters. Generally, it is preferred that the weight ratio be from about 10:90 to 90:10 and more preferably from about 20:80 to 60:40.

In preparing the modified organopolysiloxanes of this invention, the graft polymerization is most expeditiously effected by using free radical initiators, normally organic peroxides. It is, however, possible to use other free radical initiators such as azo compounds in which the two nitrogen atoms of the azo group are attached to the tertiary carbon atoms and the remaining valences of the tertiary carbon atoms are saturated by nitrile, carboxyl, cycloalkylene or alkyl groups, preferably having from one to 18 carbon atoms.

Examples of preferred free radical initiators are diacylperoxides such as benzoyl peroxide, ketoperoxides such as acetone peroxide and cyclohexanone peroxide; hydrocarbon-hydroperoxides such as tert-butyl hydroperoxide, cumene hydroperoxide and decahydronaphthalene hydroperoxide; dialkyl peroxides such as ditertbutyl and dicumylperoxide; perketales such as 1,1-di-tert-butyl peroxy-3,5,5-trimethylcyclohexane; peresters, such as tert-butyl perbenzoate; tert-butylperoxyisopropylcarbonate, tert-butylperpivalate, tert-butylperoctoate and tert-butylpermaleate; and acetylcyclohexanesulfonylperoxide. Mixtures of the various free radical initiators may also be used.

The amount of free radical initiator used is not critical. Thus, any amount capable of producing a perceptible degree of grafting is suitable. Generally, as little as 0.01 percent up to about 5 percent by weight and more preferably from about 0.1 to 2 percent by weight based on the total weight of the reactants may be employed.

These free radical initiators can be employed in a number of ways. When, for example, the half-life of the free radical initiator in toluene is more than 2 hours at the polymerization temperature, then a portion of the total amount or all of the free radical initiator can be mixed with the organopolysiloxane and monomer containing aliphatic unsaturation. However, if the half-life of the free radical initiator in toluene is less than 2 hours at the polymerization temperature, then it is preferred that the free radical initiator be added in increments or continuously during the polymerization.

The expressions "polymers obtained via graft polymerization" and the term "modified organopolysiloxanes" as used herein are intended to include the polymer obtained as a result of the graft polymerization; regardless of whether the monomers containing aliphatic unsaturation are connected to the organopolysiloxane polymer via carbon-to-carbon bonds, mono- or copolymers formed from the monomers having aliphatic unsaturation and any unreacted organopolysiloxanes which were employed as the initial reactant.

The liquid employed in the process of this invention has a boiling point which does not exceed about 100° C. at 760 mm Hg (abs.) and is inert to the organopolysiloxane, the monomers and the polymers obtained from the graft polymerization. Likewise, the organopolysiloxanes and the polymers obtained as a result of the graft polymerization are substantially insoluble in the liquid, i.e., at the applicable polymerization temperature not more than 1 part by weight of the resulting polymer is soluble in 100 parts by weight and preferably in 1,000 parts by weight of the inert liquid. Moreover, not more than 1 part by weight of the inert liquid is soluble in 100 parts and more preferably in 1,000 parts by weight of the organopolysiloxane, the monomers or the polymers resulting from the graft polymerization at the applicable polymerization temperature.

Examples of suitable inert liquids which may be used in the process of this invention are water, methanol and saturated aliphatic fluoro- and chlorohydrocarbons in which three halogen atoms are linked to at least one carbon atom such as 1,1,2,2-tetrafluorodichloroethane and monofluorotrichloromethane. Water is the preferred inert liquid since it is readily available and the organopolysiloxane, monomer and the polymer obtained from the graft polymerization are insoluble therein.

It is possible to use a mixture consisting of several liquids having a boiling point of no more than 100° C. at 760 mm Hg (abs.) which are inert towards the constituents of the graft polymerization and in which neither the to-be-grafted organopolysiloxane nor the polymers obtained as a result of the graft polymerization are soluble at the polymerization temperature employed.

It is preferred that the inert liquid having a boiling point up to about 100° C. at 760 mm Hg (abs.), which is inert with respect to the other constituents of the graft polymerization and the polymer resulting from the graft polymerization, be employed in amounts of from 2 to about 20 percent by weight based on the total weight of the reactants, i.e., the aliphatic unsaturated monomers the organopolysiloxanes and the free radical initiators.

In contrast to the emulsion or suspension polymerizations (oil-in-water dispersion) employed heretofore in which the solvents or water surround the organic phase, we have found that the inert liquid having a boiling point of no more than 100° C. at 760 mm Hg (abs.) can still evaporate and flow back and/or transfer heat to the walls of the polymerization vessel even though it is surrounded by a relatively highly viscous organopolysiloxane (water-in-oil dispersion). Thus, it is apparent that the inert liquid serves as a coolant and thereby helps to moderate the polymerization reaction.

Furthermore, the process of this invention does not require the use of a dispersing agent to assure uniform dispersion in order to obtain uniform removal of the heat generated during the graft polymerization from the reaction mass. In fact, it is preferred that a dispersing agent not be used in the graft polymerization since it could bring about the deterioration of the electrical properties in the polymerization. Nevertheless, the possibility of using a dispersing agent such as, for example, a protective colloid such as polyvinyl alcohol or an emulsifier, especially a cation-active emulsifier such as oxyethyldodecyl ammonium chloride, is not to be excluded.

The process of this invention can be carried out with the same equipment which has been used heretofore in the preparation of modified organopolysiloxanes by the graft polymerization process. In order to achieve good control of the heat involved during the graft polymerization, it is preferred that the polymerization vessel be provided with a reflux condenser.

The monomers containing aliphatic unsaturation may be added to the polymerization vessel before the graft polymerization is initiated or they can be added intermittently or continuously to the other constituents of the graft polymerization at the desired polymerization temperature.

The temperatures and pressures used in the process of this invention are in the same general range as those used heretofore in the preparation of modified organopolysiloxanes by means of graft polymerization. Generally, temperatures in the range of from 50° to 200° C. and pressures of from 0.1 to 20 atmospheres are preferred. When the inert liquid has a boiling point above the polymerization temperature employed and the monomers having aliphatic unsaturation have a boiling point above that of the inert liquid, then the process can then be carried out at atmospheric pressure.

The process of this invention for preparing modified organopolysiloxanes may be conducted as a continuous, semicontinuous or batch-wise process.

It is believed that the shear rate has a profound influence on the preparation of elongated, rod-like particulate matter. Thus, it is preferred that the stirring be such that the shear rate is from 5 to 1000 sec$^{-1}$. The unreacted monomers containing aliphatic unsaturation and the inert liquid can be removed at the end of the graft polymerization by any conventional means. Distillation at from 1 to 500 mm Hg (abs.) and from 50° to 150° C. is preferred. Steam or a gas which is inert to the polymers and monomers such as nitrogen, can be passed through the reaction mixture to aid in the removal of the unreacted monomers and inert liquid.

The modified organpolysiloxanes can be used in the formation of room temperature or heat vulcanizable elastomers.

The compounds which cure into elastomers at room temperature can consist of "two-component systems" which are prepared by mixing the modified organopolysiloxane having terminal functional groups with a cross-linking agent more or less immediately prior to their final shaping or they can consist of so called "one-component systems" which cure to elastomeric solids when exposed to atmospheric moisture.

The one-component systems can be prepared by mixing modified organopolysiloxanes having in each of their terminal units an Si-bonded hydroxyl group with silicon compound which have at least 3 Si-bonded groups per molecule that are hydrolyzable in the presence of atmospheric moisture and, if necessary, a cross-linking catalyst. Examples of suitable polyfunctional silicon compounds are methyltriacetoxysilane, tetraacetoxysilane, methyl-tert-butoxyacetoxysilicon compounds having a total of at least three tert-butyl groups and acetoxy groups per molecule; methyltris(-cyclo-hexylamino)-silane, isopropyltriacetoxysilane, isopropoxytriacetoxysilane, methyltriacetoximosilane, methyltris(diethylaminoxy)silane, methyltris(diethylphosphato)silane and methyltris(isopropylamino)-silane.

The two-component systems can be prepared by mixing the modified organopolysiloxanes having in each of their terminal units an Si-bonded hydroxyl group with such cross-linking agents as silanes corresponding to the general formula $R_mSi(OR')_{4-m}$, in which R is the same as above, R' is a hydrocarbon radical which may be interrupted by an ether oxygen atom, and where m is 0 or 1; or they can be mixed with siloxanes which are fluid at room temperature and which contain at least three SiOR' groups and/or at least three Si-bonded hydrogen atoms, in which case those silicon valences which are not saturated by siloxane-oxygen atoms, —OR'— groups and hydrogen atoms, are saturated by R groups. These compositions are then cured to an elastomeric solid by the addition of condensation catalysts.

Suitable examples of cross-linking agents which may be used in the preparation of the two-component systems are methyltriethoxysilane, tetraethoxysilane, "ethylsilicate 40", i.e., an ethylpolysilicate having an $SiO_2$ content of at least 40 percent by weight, isopropylpolysilicates, n-butylpolysilicates, methylbutoxydiethoxysilane and dimethyltetraethoxydisiloxane, as well as methyltris(methoxyethoxy)-silane.

During the preparation of the one-component systems as well as during the preparation of the two-component systems, the polyfunctional silicon compounds are used in amounts of from about 0.5 to 20 percent by weight, and more preferably from about 1 to about 10 percent by weight based on the weight of the modified organopolysiloxanes.

Examples of suitable condensation catalysts are metallic salts of carboxylic acids or organometallic salts of carboxylic acids in the electrochemical series of from lead to manganese. The metallic component of the catalyst is preferably tin. Suitable tin compounds are dibutyltin dilaurate, dibutyltin diacetate, tin-II-octoate; a dibutyltin diacylate in which the acylate groups are derived from a mixture of carboxylic acids having from 9 to 11 carbon atoms per molecule and the carboxyl group is bonded to a tertiary carbon atom in at least 90 percent by weight of the acids. Other tin compounds are dibutyltin dioctoate, distannoxanes such as, for example, diacetoxytetrabutyldistannoxane and dioleyloxytetramethyldistannoxane; ferric octoate, lead octoate, lead laurate and cobalt naphthenate; titanates such as tetrabutyl titanate; amines such as n-hexylamine; amine salts such as n-hexylamine hydrochloride and n-butylaminoacetate.

These catalysts may be dispersed in the modified organopolysiloxanes or they may be dissolved or dispersed in an inert solvent. Examples of suitable solvents which may be used for this purpose are aliphatic or aromatic hydrocarbons which are liquid at 20° C., 760 mm Hg (abs.) such as hexane, cyclohexane, heptane, benzene, toluene and xylene; chlorinated hydrocarbons such as trichloroethylene and tetrachloroethane; ethers such as diethylether and dibutylether, as well as hydroxyl-free organopolysiloxanes which are liquid at room temperature such as trimethylsiloxy-terminated dimethylpolysiloxanes. When the solvents are not organopolysiloxanes, it is preferred that they be of sufficient volatility to vaporize off at room temperature.

These curable compositions may be compounded in the usual manner for preparing conventional siloxane elastomers. Thus, fillers which have been used in conventional organopolysiloxane compositions may be used with the modified organopolysiloxanes of this invention. Examples of suitable fillers which may be employed are silicon dioxide having a surface area of more than 50 m$^2$/g such as pyrogenically produced silicon dioxide and precipitated silicon dioxide having a surface area of more than 50 m$^2$/g; diatomaceous earth, crushed quartz, titanium dioxide, ferric oxide and zinc oxide. Treated fillers as well as untreated fillers may be employed in these compositions. The fillers may be treated with, for example, triorganoalkoxysilanes, e.g., trimethylethoxysilane to provide fillers having organosiloxy groups on their surfaces. Examples of other materials which may be employed in these curable compositions are fibrous fillers such as asbestos and glass fibers, pigments, antioxidants, ultraviolet ray absorbents and cell-generating agents such as azodicarbonamide.

The elastomers prepared from the modified organopolysiloxanes produced pursuant to this inventin are exceptionally well suited as packing material, as potting compounds, as coating and molding compositions. The resulting elastomers have extremely high tensile strength, elongation and tear resistance. The modified organopolysiloxanes are not only suitable for the preparation of elastomers, but are also suitable as lubricants or as a component in lubricant compositions. Also, these modified organopolysiloxanes may be used in the preparation of adhesive-resistant coatings, as plastic sealants and as hydraulic fluids.

Various embodiments of this invention are further illustrated by the following examples in which all parts are by weight unless otherwise specified. The viscosities of the modified organopolysiloxanes proposed in the following examples were determined with the Brookfield-viscometer (Model LVT Spindle No. 4).

EXAMPLE 1 a. To a polymerization vessel having an inside diameter of 120 mm which is equipped with a 200 rpm flat blade paddle stirrer having a blade length of 60 mm, a gas supply pipe, a reflux condenser and a temperature recording device are added 312 parts of styrene 384 parts of n-butyl acrylate, 465 parts of dimethylpolysiloxane having an Si-bonded hydroxyl group in each of its terminal units and having a viscosity of 430 cP at 25° C., 10.5 parts of a commercially available mixture of equal parts of 1,1-di-tert-butyl-peroxy-3,3,5-trimethyl-cyclohexane and a phthalic acid ester (as a diluent) and 50 parts of water and thereafter heated under nitrogen for 7 hours by means of an oil bath maintained at 100° C. During this period of time, the temperature did not exceed 97° C.

Unreacted styrene and butyl acrylate are removed via aqueous steam distillation. The amount of such unreacted monomers is determined by means of quantitative NMR spectroscopy in carbon tetrachloride with octamethylcyclotetrasiloxane as the internal standard. Approximately 90 percent by weight of the monomers is converted in the graft polymerization. The water is distilled off to 110° C. at 12 mm Hg (abs.). The viscosity of the modified organopolysiloxane is 9800 cP at 25° C. Solid polymers which are rod-like in shape are present in the continuous liquid phase.

b. For purposes of comparison the method of Example 1(a) is repeated, except that the water is omitted. After about 30 minutes the temperature of the reactants in the polymerization vessel increased to 100° C. and remained constant. Shortly thereafter the temperature suddenly increased and after 50 minutes the temperature increased to 157° C. and after an additional 2 hours it dropped to 95° C. The monomer conversion is about to 89 percent by weight and the viscosity of the modified organopolysiloxane is 9600 cP at 25° C. Solid polymers which are globular in configuration are present in the continuous liquid phase.

c. For purposes of comparison the method of Example 1(a) is repeated, except that water is omitted and during the initial heating, only 375 parts of dimethylpolysiloxane and no perketale are added to the reactor. Following the initial heating step 90 parts of dimethylpolysiloxane together with 10.5 parts of the commercially available mixture consisting of equal parts by weight of 1,1-di-tert-butylperoxy-3,3,5-trimethylcyclohexane and a phthalic acid ester, are added in increments of about 5 percent by weight of each in 20 minute intervals. Within about 140 minutes the polymerization temperature increased to about 105° C. then dropped to 95° C. after an additional 100 minutes, and after about 400 minutes after the initial heating step, it increased to about 112° C.

About 97 percent by weight of the monomers employed in the graft polymerization is converted and the viscosity of the modified organopolysiloxane is 11,000 cP at 25° C. Solid polymers which are both rod-like and globular in shape are present in the continuous liquid phase.

EXAMPLE 2

The process described in Example 1(a) is repeated except that a dimethylpolysiloxane having an Si-bonded hydroxyl group in each of its terminal units and a viscosity of 80 cP at 25° C. is substituted for the dimethylpolysiloxane. The polymerization temperature did not exceed 97° C.

Approximately 97 percent by weight of the monomers employed in the graft polymerization is converted and the viscosity of the modified organopolysiloxane is 100,000 cP at 25° C. Solid polymers which are rod-like in shape are present in the continuous liquid phase.

EXAMPLE 3

The process described in Example 1(a) is repeated except that only 235 parts of dimethylpolysiloxane are employed. The polymerization temperature did not increase above 97° C.

Approximately 97 percent by weight of the monomers is converted in the polymerization. The viscosity of the modified organopolysiloxane is > 2×10$^6$ cP at 25° C. Solid polymers which are rod-like in shape are present in the continuous liquid phase.

EXAMPLE 4

To a polymerization vessel having a diameter of 312 mm which is equipped with a 50 rpm horse shoe agitator with a lengthwise expansion of 295 mm in the widest section, a gas supply pipe, a reflux condenser and a temperature recording device are added a mixture consisting of 5200 parts of styrene, 4200 parts of n- butyl acrylate, 6250 parts of a hydroxyl-terminated dimethylpolysiloxane having a viscosity of 80 cP at 25° C., 800 parts of water and 141 parts of 1,1-di-tert.-butylperoxy-3,3,5-trimethylcyclohexane under an atmosphere of nitrogen and heated for 7 hours by means of a steam jacket maintained at 100° C. The polymerization temperature did not exceed 97° C.

The unreacted monomers and water are removed by passing nitrogen through the reaction mixture at a temperature of from 100 to 130° C. The reaction mixture is then heated for 3 hours to 130° C. at 12 mm Hg (abs.). Approximately 90 percent by weight of the monomers are converted into polymers. The viscosity of the modified organopolysiloxane is 2500 cP at 25° C. Solid polymers which are rod-like in shape are present in the continuous liquid phase.

EXAMPLE 5

The prcess described in Example 4 is repeated except that 4040 parts of a hydroxyl-terminated dimethylpolysiloxane having a viscosity of 430 cP at 25° C. are substituted for the dimethylpolysiloxane having a viscosity of 80 cP at 25° C.

Approximately 90 percent by weight of the monomers are converted in the polymerization. The viscosity of the modified organopolysiloxane is 22,000 cP at 25° C. Solid polymers which are rod-like in shape are present in the continuous liquid polymer.

EXAMPLE 6

About 100 parts by weight of each of the modified organopolysiloxanes prepared in accordance with Examples 1(a), 2, 4 and 5 are each mixed with 3 parts by weight of ethylpolysilicate having an $SiO_2$ content of 40 percent by weight and 1 part by weight of dibutyltin diacylate in which the acylate groups are derived from a mixture consisting of 9 to 11 carbon atoms per molecule in which the carboxyl group is bonded to a tertiary carbon atom in at least 90 percent by weight of the acids, i.e., a so called "dibutyltindiversatate".

The composition are poured into a mold and cured at room temperature. After 7 days the properties of the thus obtained elastomers are indicated in the following table:

TABLE

| Modified organo-polysiloxane of Example No. | Tensile strength per DIN 53,455 kp/cm² | Elongation at fracture in percent, per DIN 53,504 | Shore hardness A per DIN 53,505 | Tear Resistance, ASTM 624 Form B kp/cm |
|---|---|---|---|---|
| 1 (a) | 94 | 526 | 42 | 20 |
| 2 | 61 | 257 | 46 | 18 |
| 4 | 85 | 127 | 88 | 31 |
| 5 | 105 | 235 | 88 | 75 |

Although the present invention has been defined with specific reference to the above examles, it should be understood that these examples are given merely for purposes of illustration and that other variations which will become apparent to those skilled in the art are to be included within the scope of this invention.

What is claimed is:

1. A method for preparing modified organopolysiloxanes which comprises contacting an organopolysiloxane in which the organic groups connected to the silicon atoms are selected from the group consisting of monovalent hydrocarbon radicals, halogenated monovalent hydrocarbon radicals and cyanoalkyl radicals with a monomer having aliphatic unsaturation in the presence of a free radical initiator and an inert liquid having a boiling point up to 100° C. at 760 mm Hg (abs.) in which the inert liquid is present in an amount of from 2 to 20 percent by weight based on the total weight of the organopolysiloxane, monomer and free radical initiator and is a nonsolvent at the polymerization temperature for the organopolysiloxane and the polymers obtained from the polymerization and the weight ratio of the organopolysiloxane to monomer is from 10:90 to 90:10.

2. The method of claim 1 wherein water is the inert liquid.

3. The method of claim 1 wherein the free radical initiator is present in an amount of from 0.01 to 5 percent based on the total weight of the reactants.

4. The method of claim 1 wherein the organopolysiloxane is a hydroxyl-terminated dimethylpolysiloxane.

5. The method of claim 1 wherein the free radical initiator is gradually added to a preformed mixture heated to the polymerization temperature containing the organopolysiloxane, monomer and inert liquid.

6. The method of claim 1 wherein the inert liquid is selected from the class consisting of water, methanol and saturated aliphatic fluoro- and chlorohydrocarbons in which three halogen atoms are linked to at least one carbon atom.

7. The method of claim 1 wherein the weight ratio of organopolysiloxane to monomer is from 20:80 to 60:40.

* * * * *